United States Patent [19]

Colman

[11] Patent Number: 4,525,113
[45] Date of Patent: Jun. 25, 1985

[54] LOAD HOLDER GUARD

[75] Inventor: Joseph C. Colman, Roanoke, Va.

[73] Assignee: Walker Machine and Foundry Company, Roanoke, Va.

[21] Appl. No.: 429,889

[22] Filed: Sep. 30, 1982

[51] Int. Cl.³ .................. B60P 7/12; B61D 45/00; B61D 49/00
[52] U.S. Cl. ............................ 410/41; 410/32; 410/36; 410/50; 410/99
[58] Field of Search .................. 410/34, 35, 36, 37, 410/38, 39, 40, 41, 42, 47, 48, 49, 50, 99, 32

[56] References Cited

U.S. PATENT DOCUMENTS

| | | | |
|---|---|---|---|
| 968,455 | 8/1910 | Eastabrook | 410/41 |
| 2,772,064 | 11/1956 | Cole | 410/47 |
| 3,073,439 | 1/1963 | Symmonds, Jr. | 410/41 X |
| 3,426,996 | 2/1969 | Broling | 410/99 X |
| 3,637,234 | 1/1972 | Thomas et al. | 410/50 |
| 3,875,617 | 4/1975 | Cline | 410/47 |

Primary Examiner—Robert B. Reeves
Assistant Examiner—Howard Beltran
Attorney, Agent, or Firm—Griffin, Branigan, & Butler

[57] ABSTRACT

A load holder (10) is used in conjunction with load binder (12) and spaces the load binder (12) away from a load (14). The load holder (10) has two selectively usable load engaging portions. A first load engaging portion (20) of the holder (10) is adapted to engage load corners while a second load engaging portion (22) is adapted to engage flat or slightly curved load surfaces. A bridge (24) integrally formed with the two load engaging portions (20, 22) has an aperture (50) therein for receiving the binder (12) which extends therethrough.

9 Claims, 4 Drawing Figures

LOAD HOLDER GUARD

BACKGROUND

This invention pertains to a load holder used in conjunction with a load binding device such as a chain, a cable, a rope or the like which girdles a load.

Loads, such as stacked lumber or containerized articles, for example, are typically girdled by a chain, cable, or rope before they can be transported and often remain girdled during storage. Loads comprising a plurality of articles, such as stacked lumber, require girdling by a cable or rope in order to keep each article in place in the load.

Usage of cables, chains, and ropes by themselves have proven unsatisfactory for many types of loads. Tight tension on a chain or cable tends to damage load portions, especially load edges, which come in contact with the chain or cable. Conversely, a load having sharp edges may tend to fray a rope or cord girdling the load.

In view of the foregoing, an object of this invention is the provision of a load holder usable in connection with load binder girdling the load for spacing the load binder away from the load for protecting both the load and the binder.

An advantage of the invention is the provision of a load holder having two selectively usable load engaging orientations for engaging either flat surfaces, curved surfaces, or corners of a load.

A further advantage of the invention is the provision of a load holder which is strong, light weight, and not easily stolen when mounted in place.

SUMMARY

A load holder is used in conjunction with load binder and spacing the load binder away from the load. The holder has two selectively usable load engaging portions. A first load engaging portion of the holder is adapted to engage load corners while a second load engaging portion is adapted to engage flat or slightly curved load surfaces. A bridge integrally formed with the two load engaging portions has an aperture therein for receiving the binding means which extends therethrough.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

Figure 1:
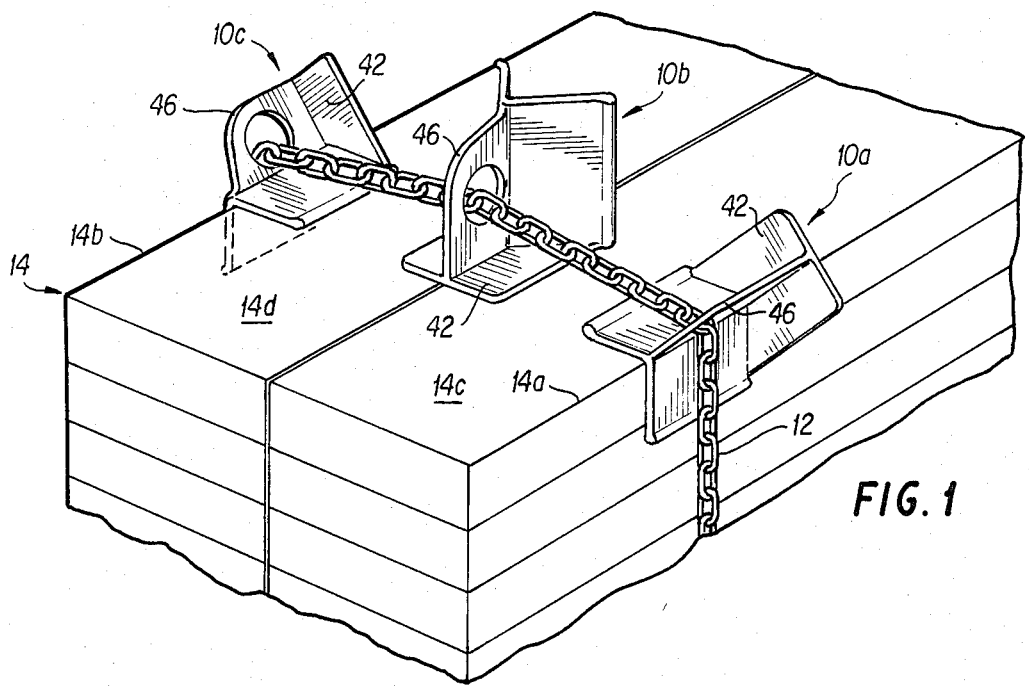
FIG. 1 is a perspective view of a plurality of load holders according to an embodiment of the invention, the load holder being used in conjunction with load binding means to hold a load.

FIG. 1 illustrates a plurality of load holders 10a, 10b, and 10c used in conjunction with load binder, such as chain 12, to hold a load 14 comprising stacked lumber. Load holder 10a engages a corner 14a of the load; load holder 10c engages a second corner 14b of the load; and, load holder 10b engages top surfaces 14c and 14d of two respective pieces of lumber included in the load. It should be understood that the stacked lumber of load 14 illustrates only one particular type of load in conjunction with which the load holders of the invention may be used, and that as many load holders as deemed necessary may be used for a particular load.

Each load holder comprises a first load engaging surface (generally referred to as 20 in FIG. 3); a second load engaging surface (labeled as 22 in FIGS. 2 and 4); and, a bridge 24. In the preferred embodiment, the load holder is fabricated from cast ductile iron so that the first load engaging surface 20 and the second load engaging surface 22 are integral with one another and also with the bridge 24. Integral construction of the load holder from cast ductile iron provides a light weight yet extremely strong device. Moreover, in one embodiment the integral load holder is plastic dipped to provide an aesthetically pleasing coating. It should be understood, of course, that the integral holder can be cast from other materials, such as aircraft aluminum, for example.

Figure 3:
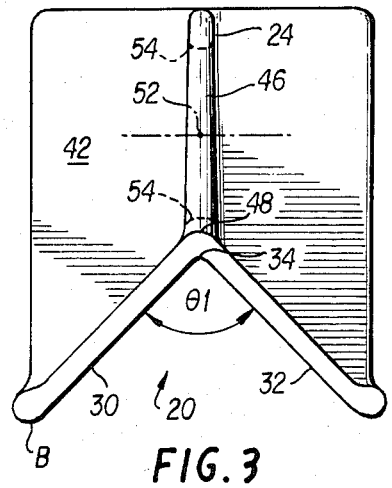
FIG. 3 is a front view of the load holder of FIG. 2.

The first load engaging surface 20 comprises a first planar load engaging surface 30 and a second planar load engaging surface 32 which intersect to form a line 34. In this respect, the planar surfaces 32 and 30 intersect at an angle $\theta 1$ as seen in FIG. 3. The angle $\theta 1$ is essentially 90° such that the planar surfaces 32 and 30 are essentially orthonogal with respect to one another.

Figure 4:
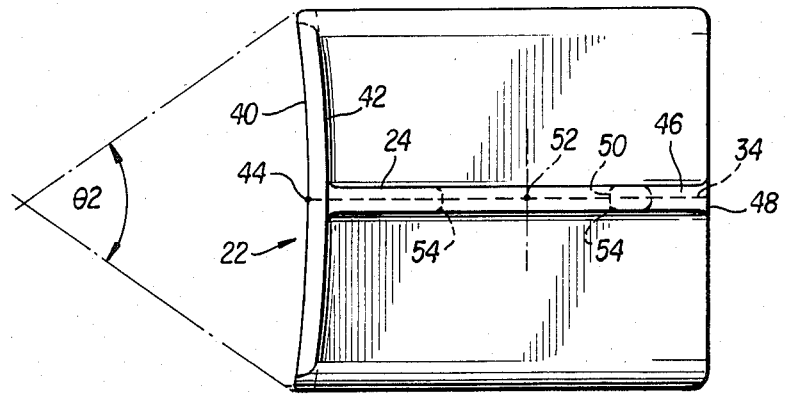
FIG. 4 is a top view of the load holder of FIG. 2.

The second load engaging surface 22 is in the shape of a sector of a thin hollow cylinder. In this respect, the sector is formed by an angle $\theta 2$ at the center C of an imaginary cylinder such that angle $\theta 2$ subtends the sector. Angle $\theta 2$ is best shown in FIG. 4, although it should be understood that FIG. 4 is not to scale inasmuch as the center C of the imaginary cylinder has been drawn for conveinence much closer to the sector 22 rather than drawn remotely therefrom. In this respect, angle $\theta 2$ preferably has a value less than 0.1 radians, such that the radius of curvature of the sector 22 is very slight.

The very slight curvature of sector 22 facilitates the engagement of both slightly curved surfaces (such as a roll of paper) or a flat surface. It should be understood, however, that in accordance with different embodiments the load engaging surface 22 may be either perfectly flat or curved with a much greater radius of curvature if desired.

The load engaging surface 22 has an interior surface 40 and an exterior surface 42. At least one line 44 on the interior surface of the load engaging surface 22 is perpendicular to the line 34 about which the first and second planar surfaces 30 and 32, respectively, of the first load engaging means 20 intersect. In this illustrated embodiment, line 44 is essentially a line forming the only tangent to the interior surface of the sector of the hollow cylinder which also intersects the line 34. The perpendicular orientation of the lines 34 and 44 can best be seen in FIG. 2 wherein both lines appear as dotted lines. Line 44 is thus perpendicular to the edges of planar surfaces 30 and 32.

Figure 2:
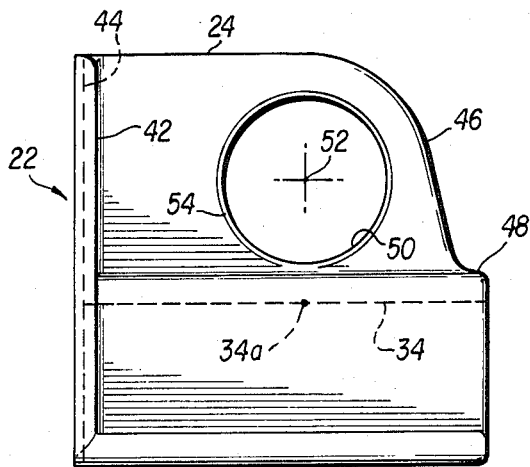
FIG. 2 is a side view of a load holder according to an embodiment of the invention.

Bridge 24 is a planar element essentially lying in a plane formed by the intersection of the lines 34 and 44. As seen in FIG. 2, at the left of the load holder the top of the bridge 24 is of essentially equal vertical extent with the second load engaging surface 22. Travelling to the right the top of the bridge 24 extends parallel to the base B of the load holder for proximately one-half the width of the load holder, then curves in sharply tapering fashion along curve 46 which finally ends at point 48 near line 34.

Bridge 24 includes a receiver for the load binder 12. In particular, the preferred embodiment in the receiver takes the form of an aperture such as a circle 50. The diameter of the circle 50 is chosen in accordance with the anticipated type of load binder with which the holder is to be used. Circle 50 has a center 52 which is seen in FIG. 2 to be directly over a midpoint 34a of the line 34. Position of the center 52 of circle 50 at this point best facilitates the distribution of equal pressure over all the parts of the load holder. The circumference of aperture 50 is preferrably chamfered as at 54 so that the intersection of each side of the bridge 24 and the aperture 50 is not sharp, thereby providing a relatively smooth surface which will not damage binder (such as a rope which would extend therethrough) and thereby facilitating a certain degree of slippage which is desirable for initially tightening the load binder.

Returning to FIG. 1, it can be seen that the load holders 10a, 10b, and 10c are all interconnected by the binder 12 which extends through the apertures of each of the respective load holders. Load holders 10a and 10c are positioned so that their first load engaging means 20 engage the respective corners 14a and 14b of the load, while load holder B is orientated so that the second load engaging surface 22 engages the top surfaces 14c and 14d of the load.

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. A load holder having two selectively usable load engaging means for holding a load, said load holder comprising:
   first load engaging means, said first load engaging means including first and second planar load engaging surfaces which intersect one another in an essentially orthogonal manner along a line of intersection;
   second load engaging means, said second load engaging means comprising a surface which intersects and is orthogonal to an edge of said first and said second planar members of said first engaging members; and,
   means for rigidly bridging said first engaging means and said second engaging means, said bridging means having therein means for receiving a load binding means, said load binding means being of a type which girdles said load.

2. The apparatus of claim 1, wherein said load holder comprises cast ductile iron so that said first and second engaging means are integral with one another and with said bridging means.

3. The apparatus of claim 1, wherein said bridging means comprises an essentially planar member lying in a plane formed by the intersection of:
   (1) said line about which said first and second planar surfaces of said first engaging means intersect; and,
   (2) said line in said load engaging surface of said second engaging means which is essentially orthogonal to the line of intersection of said first and said second planar members of said first engaging means.

4. The apparatus of claim 3, wherein said means for receiving said load binding means includes an aperture formed in said bridging means.

5. The apparatus of claim 4, wherein said aperture is a circle and wherein a perpendicular from the center of said circle to said line about which said first and second planar surfaces of said first engaging means intersect essentially bisects said line in to two segments of essentially equal length.

6. A load holder having two selectively usable load engaging means for holding a load, said load holder comprising:
   first load engaging means, said first load engaging means including first and second planar load engaging surfaces which intersect one another in an essentially orthogonal manner along a line of intersection;
   second load engaging means having the shape of a sector of a hollow cylinder having a load engaging surface comprising an interior surface of said sector, said load engaging surface of said second load engaging means intersecting said edges of said first and second planar surfaces of said first load engaging means; and,
   means for rigidly bridging said first engaging means and said second engaging means, said bridging means having therein means for receiving a load binding means, said load binding means being a type which girdles said load.

7. The apparatus of claim 6, wherein said bridging means comprises an essentially planar member lying in a plane formed by the intersection of:
   (1) said line about which said first and second planar surfaces of said first engaging means intersects; and,
   (2) said line in said load engaging surface of said second engaging means which is essentially orthogonal to the line of intersection of said first and said second planar members of said first engaging means.

8. The apparatus of claim 7, wherein said means for receiving said load binding means includes an aperture formed in said bridging means.

9. The apparatus of claim 8, wherein said aperture is a circle and wherein a perpendicular from the center of said circle to said line about which said first and second planar surfaces of said first engaging means intersect essentially bisects said line into two segments of essentially equal length.

* * * * *